(12) United States Patent
McGory et al.

(10) Patent No.: US 11,091,203 B2
(45) Date of Patent: Aug. 17, 2021

(54) VEHICLE BODY STRUCTURE

(71) Applicant: Nissan North America, Inc., Franklin, TN (US)

(72) Inventors: Michael McGory, West Bloomfield, MI (US); Patrick Grattan, Wixom, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 77 days.

(21) Appl. No.: 16/554,283

(22) Filed: Aug. 28, 2019

(65) Prior Publication Data

US 2021/0061358 A1    Mar. 4, 2021

(51) Int. Cl.
| | | |
|---|---|---|
| *B62D 21/15* | (2006.01) | |
| *B62D 27/06* | (2006.01) | |
| *B62D 27/02* | (2006.01) | |
| *B62D 25/08* | (2006.01) | |

(52) U.S. Cl.
CPC ......... *B62D 21/155* (2013.01); *B62D 21/152* (2013.01); *B62D 25/085* (2013.01); *B62D 27/02* (2013.01); *B62D 27/06* (2013.01)

(58) Field of Classification Search
CPC .... B62D 21/11; B62D 21/152; B62D 21/155; B62D 25/08; B62D 25/085; B62D 27/02
USPC .......................................... 296/187.09, 187.1
See application file for complete search history.

(56) References Cited

U.S. PATENT DOCUMENTS

| | | | | |
|---|---|---|---|---|
| 1,521,757 A | * | 1/1925 | Cox ...................... | B60R 19/285 293/135 |
| 1,645,056 A | * | 10/1927 | William ................. | B60R 19/20 293/107 |
| 3,781,049 A | * | 12/1973 | Cantrell ................ | B60R 19/285 293/135 |
| 3,927,907 A | * | 12/1975 | Bialek ................... | B60R 19/445 293/135 |
| 6,139,092 A | * | 10/2000 | Doner .................... | B60G 11/10 293/138 |
| 9,908,564 B1 | | 3/2018 | Grattan | |
| 10,029,733 B1 | | 7/2018 | Grattan | |
| 10,118,644 B2 | | 11/2018 | Grattan | |
| 10,150,507 B2 | | 12/2018 | Grattan | |
| 10,189,503 B2 | | 1/2019 | Grattan | |

FOREIGN PATENT DOCUMENTS

| | | | |
|---|---|---|---|
| DE | 102013223976 | * | 5/2015 |
| GB | 234774 | * | 9/1925 |

OTHER PUBLICATIONS

Translation of DE102013223976 (Year: 2015).*

* cited by examiner

*Primary Examiner* — Dennis H Pedder
(74) *Attorney, Agent, or Firm* — Global IP Counselors, LLP (57) ABSTRACT

A vehicle body structure includes a vehicle structure, and an off-center impact structure. The vehicle structure has a front side member with a front end and a front-section extending rearward from the front end. The front side member extends in a vehicle longitudinal direction. The off-center impact structure includes a leaf-spring assembly with a plurality of leaf-springs attached to one another. The off-center impact structure is attached to the front side member at the front-section such that the leaf-spring assembly extends in a lateral outboard direction from the front side member.

20 Claims, 10 Drawing Sheets

VEHICLE BODY STRUCTURE

BACKGROUND

Field of the Invention

The present invention generally relates to vehicle body structure. More specifically, the present invention relates to vehicle body structure that includes an off-center impact structure positioned and configured to absorb impact energy in response to an off-center impact event.

Background Information

Vehicles are routinely being re-designed with many features that strengthen the basic structure of the vehicle and the vehicle's response to impact events. In recent years one focus of the re-design process is to include structures that reduce deformation of a vehicle frame in response to an off-center impact event, where the vehicle contacts a barrier or object proximate a lateral side area of the vehicle.

SUMMARY

One object of the present disclosure is to include an off-center impact structure that absorbs impact energy during an off-center impact event.

Another object of the present disclosure is to provide an off-center impact structure with a plurality of leaf members, each leaf member absorbing a portion of off-center impact energy.

In view of the state of the known technology, one aspect of the present disclosure is to provide a vehicle body structure with a vehicle structure and an off-center impact structure. The vehicle structure has a front side member with a front end and a front-section extending rearward from the front end. The front side member extends in a vehicle longitudinal direction. The off-center impact structure includes a leaf-spring assembly with a plurality of leaf-springs attached to one another. The off-center impact structure is attached to the front side member at the front-section such that the leaf-spring assembly extends in a lateral outboard direction from the front side member.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
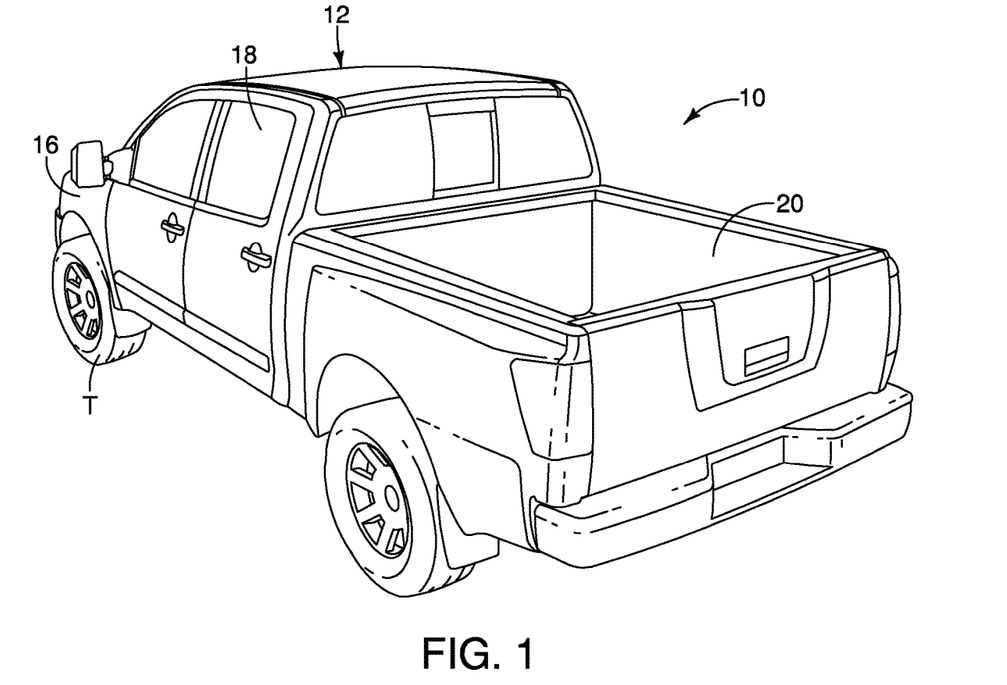
FIG. 1 is a perspective view of a vehicle having an off-center impact structure in accordance with a first embodiment.
Figure 2:
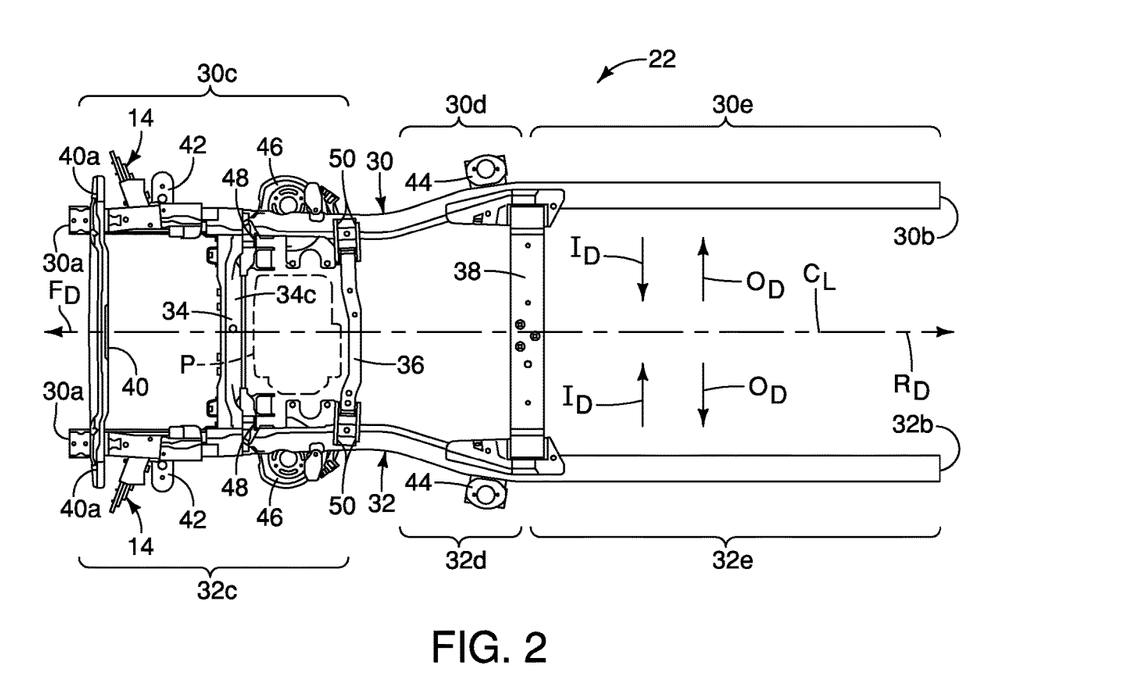
FIG. 2 is a bottom view (looking upward) of a frame of the vehicle depicted in FIG. 1, showing a pair of off-center impact structures attached to respective front side members at either side of a forward area the frame in accordance with the first embodiment.

Referring initially to FIGS. 1 and 2, a vehicle 10 with a vehicle body structure 12 that includes an off-center impact structure 14 (FIG. 2), is illustrated in accordance with a first embodiment.

Figure 3:
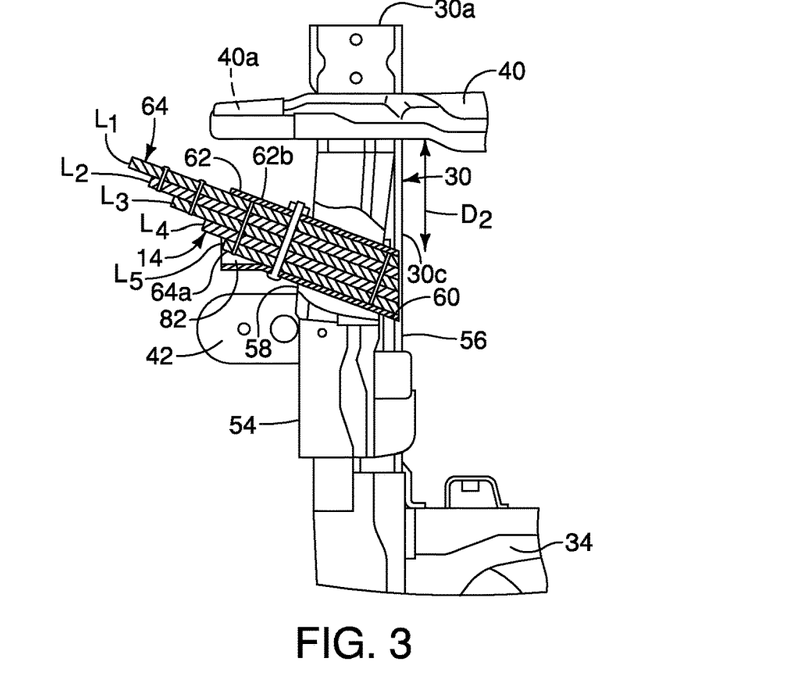
FIG. 3 is a top view of a front section of one of the front side members of the frame showing one of the off-center impact structures in a non-impacted state prior to contact with a fixed barrier in an impact event in accordance with the first embodiment.
Figure 4:
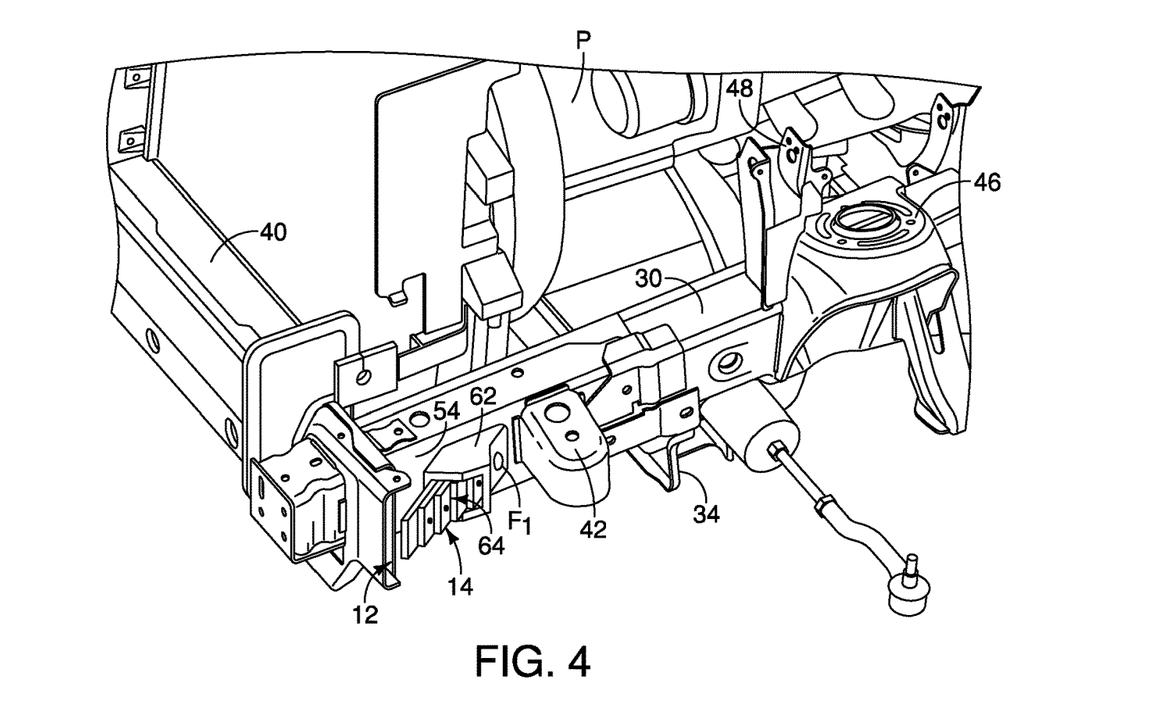
FIG. 4 is another perspective view of the front section of the front side member of the frame depicted in FIG. 3 showing a sleeve and a plurality of leaf springs of the off-center impact structure, the plurality of leaf springs shown with five leaf springs in accordance with the first embodiment.

In FIG. 1, the vehicle 10 is depicted as a pickup truck that includes the vehicle body structure 12 and defines, for example. an engine compartment 16, a passenger compartment 18 and a cargo area 20. The vehicle body structure 12 is installed to and rests on a frame 22. The frame 22 and/or portions thereof are shown removed from the vehicle 10 in FIGS. 2-9. Specifically, FIG. 2 shows the frame 22 with a pair of the off-center impact structures 14 installed thereto, the off-center impact structures 14 being installed to opposite sides of the frame 12. FIGS. 3 and 4 show only a front area of one side of the frame 22 with the off-center impact structure 14 installed thereto.

In FIG. 1, the depicted pickup truck that defines the vehicle 10 is a heavy-duty vehicle intended to haul large and/or heavy materials. The frame 22 is therefore a rigid, strong structure able to withstand heavy duty usage. However, it should be understood from the drawings and the description herein, that the frame 22 and the off-center impact structures 14 described below can be configured for smaller vehicles or larger vehicles and is not limited to usage in a heavy-duty vehicle such as the vehicle 10.

In other words, the off-center impact structure 14 can be used on any size vehicle that includes a frame such as the frame 22 where the vehicle body structure 12 attaches to and is supported by the frame 22. It should also be understood from the drawings and description, that the off-center impact structure 14 can also be employed with a unibody vehicle. A unibody vehicle is a vehicle that does not typically includes a separate frame such as the frame 22. Rather, the unibody vehicle includes various structural elements welded together. Elements of the unibody vehicle serve as frame elements functionally equivalent to the elements of the frame 22. For example, U.S. Pat. No. 8,870,267 assigned to Nissan North America, discloses a unibody vehicle body structure. The front structural support portions (30) disclosed in U.S. Pat. No. 8,870,267 are basically vehicle side members, such as those of the frame 22 (described in greater detail below). U.S. Pat. No. 9,180,913, also assigned to Nissan North America, also discloses a unibody vehicle body structure and further discloses an engine cradle. See the fifth embodiment described herein below and shown in FIGS. 15-16). The elements of the off-center impact structure 14 can be installed to portions of the unibody vehicle disclosed in U.S. Pat. No. 8,870,267 and/or portions of the engine cradle of U.S. Pat. No. 8,870,267. Both U.S. Pat. Nos. 8,870,267 and 9,180,913 are incorporated herein by reference in their entirety. Since unibody vehicles and vehicles with an engine cradle are conventional structures, further description is omitted for the sake of brevity.

In FIG. 2 several directions relative to the frame 22 (and the vehicle 10) are shown in order to define orientations of the various features of the vehicle 10 and the off-center impact structure 14. Specifically, the vehicle 10 and the frame 22 define a longitudinal center line $C_L$ that extends in a lengthwise direction of the vehicle 10 along a central portion of the vehicle 10. At a left-hand side of FIG. 2, a forward direction $F_D$ is indicated by the depicted arrow, and at a right-hand side of FIG. 2 a rearward direction $R_D$ is indicated by the depicted arrow. As well, inboard directions $I_D$ and outboard directions $O_D$ relative to the longitudinal center line $C_L$ are also shown in FIG. 2.

As shown in FIG. 2, the frame 22 includes a front side member 30, a second side member 32, a first cross-member 34, a second cross-member 36 and a third cross-member 38 and a front cross-member 40. FIG. 2 shows an underside of the frame 22. In other words, the depiction of the frame 22 is taken from below the frame 22 looking upward. The frame 22 is made of heavy gauge steel but can alternatively be made of other materials depending upon the overall design of the vehicle 10. It should therefore be understood that the front side member 30 extends along and under a driver's side of the vehicle 10, and the second side member 32 extends along and under a passenger's side of the vehicle 10.

The front side member 30 is an elongated beam (also referred to as a structural member) that has multiple contours and shapes. Specifically, the front side member 30 has a front end 30a and a rear end 30b. The front side member 30 also has a first portion 30c, a second portion 30d and a third portion 30e. The first portion 30c extends in the rearward direction $R_D$ from the front end 30a to a location proximate the second cross-member 36. The first portion 30c is generally straight. The second portion 30d has a curved shape such that just rearward of the first portion 30c, the second portion 30d gradually curves in the outboard direction $O_D$. The third portion 30e is generally straight, but can include contours and curves, depending upon the overall design of the vehicle 10.

Similarly, the second side member 32 is an elongated beam (a second side member) that has multiple contours and shapes that are symmetrical to the front side member 30. Specifically, the second side member 32 has a front end 32a and a rear end 32b. The second side member 32 also has a first portion 32c, a second portion 32d and a third portion 32e. The first portion 32c extends in the rearward direction $R_D$ from the front end 32a to a location proximate the second cross-member 36. The first portion 32c is generally straight. The second portion 32d has a curved shape such that just rearward of the first portion 32c, the second portion 32d gradually curves in the outboard direction $O_D$.

The first portions 30c and 32c of the first and second side members 30 and 32 are a first distance away from one another, and the third portions 30e and 32e are a second distance away from one another, with the second distance being greater than the first distance.

Figure 6:
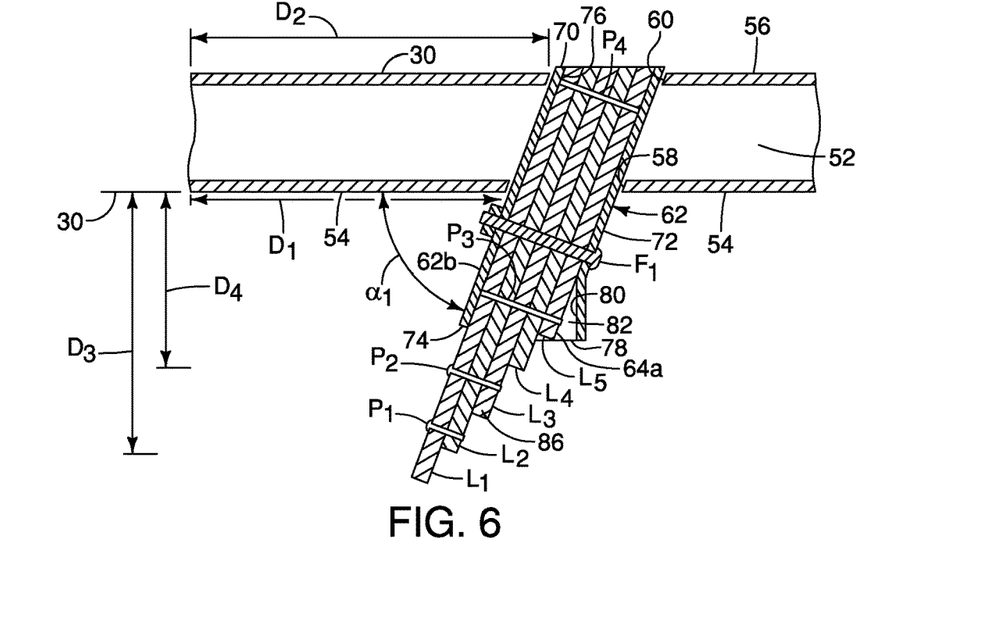
FIG. 6 is a top part cross-sectional view of the front section of the front side member showing the sleeve and the plurality of leaf springs in accordance with the first embodiment.

The first and second side members 30 and 32 each include body attachment structures 42 and 44 (also referred to as attachment flanges). The body attachment structures 42 and 44 are welded to the first and second side members 30 and 32 and are dimensioned and shaped to attach to the vehicle body structure 12 of the vehicle 10. The body attachment structures 42 extend from outboard sides of the first portions 30c and 32c of the first and second side members 30 and 32 forward of the first cross-member 34. The body attachment structures 44 extend from outboard sides of the second portions 30d and 32d of the first and second side members 30 and 32 rearward of the second cross-member 36. As shown in FIG. 6, the body attachment structures 42 extend above a portion of the off-center impact structures 14. FIGS. 2-4 make it appear that the off-center impact structures 14 and the body attachment structures 42 contact one another outboard of the frame 22. However, this is not the case. The off-center impact structures 14 and the body attachment structures 42 do not contact one another and are spaced apart from one another.

Although not shown in FIG. 2, the third portions 30e and 32e of the first and second side members 30 and 32 can also include additional body attachment structures (not shown) configured for attachment to structures that define the cargo area 20 of the vehicle 10. Further, the third portions 30e and 32e can be at the same level above the ground as the first portions 30*c* and 32*c*, or, can be raised above the ground at a level higher that the first portions 30*c* and 32*c*, with the second portions 30*d* and 32*d* including an upward curvature.

As shown in FIG. 2, each of the first portions 30*c* and 32*c* of the first and second side members 30 and 32 further include front suspension structures such as coil spring supports 46, first suspension structures 48 and second suspension structures 50.

The coil spring supports 46 are rigidly fixed (i.e. welded) to respective ones of the first and second side members 30 and 32. The coil spring supports 46 are dimensioned and shaped to support lower ends of front suspension coil springs in a conventional manner. Since front suspension coil springs are conventional structures, further description is omitted for the sake of brevity.

The first suspension structures 48 and the second suspension structures 50 are configured to support a lower control arm (not shown) for pivotal movement about pivot bolts 54. The lower control arm is part of the steering and suspension structure of the vehicle 10. Since steering and suspension structures (and, in particular, control arm structures) are conventional vehicle components, further description is omitted for the sake of brevity.

The engine compartment 16 of the vehicle body structure 12 is approximately located in the space at least partially above and between the first portions 30*c* and 32*c* of the first and second side members 30 and 32. A front portion of the passenger compartment 18 is located in the space above and between the second portions 30*d* and 32*d* of the first and second side member rearward of the engine compartment 16. The remainder of the passenger compartment 18 and the cargo area 20 of the vehicle body structure 12 are located above the third portions 30*e* and 32*e* of the first and second side members 30 and 32.

As shown in FIGS. 2-4, the first cross-member 34 is rigidly attached to the front side member 30 and rigidly attached to the second side member 32. The first cross-member 34 can be co-planar with the first and second side members 30 and 32, or, can be located above or below the first and second side members 30 and 32. A first end of the first cross-member 34 is fixedly attached to the first side member 30 and a second opposite end of the first cross-member 34 is fixedly attached to the second side member 32 in a conventional manner.

In the depicted embodiment, the first cross-member 34 extends in a vehicle lateral direction from the first portion 30*c* of the front side member 30 to the first portion 32*c* of the second side member 30 at a location rearward of the front ends 30*a* and 32*a*. As shown in FIGS. 2-4, the first cross-member 34 extends perpendicular to the first portion 30*c* of the front side member 30 and the first portion 32*c* of the second side member 32.

The second end of the first cross-member 34 is also fixed to the second side member 32 in a manner consistent with the attachment of the first end to the front side member 30.

The second cross-member 36 extends in the vehicle lateral direction and is rigidly fixed to areas of each of the front side member 30 and the second side member 32 rearward of the first cross-member 34. The second cross-member 36 can be welded to each of the first portions 30*c* and 32*c* of the first and second side members 30 and 32. However, the second cross-member 36 can be attached to the first and second side members 30 and 32 via mechanical fasteners (not shown).

Figure 5:
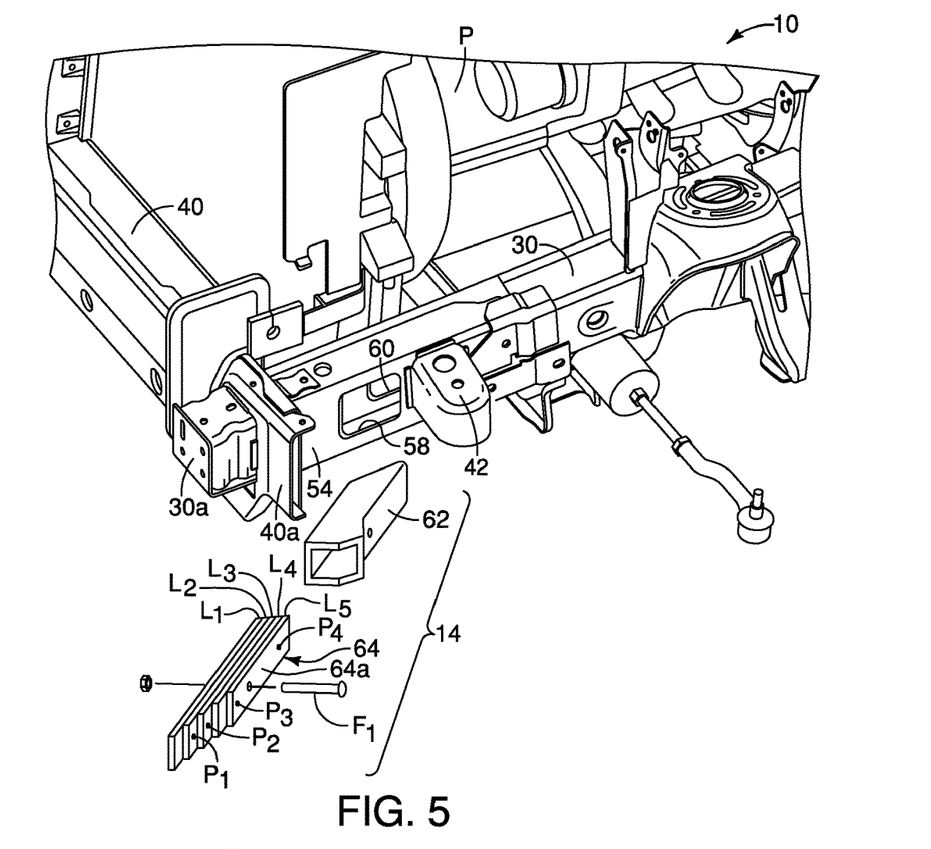
FIG. 5 is an exploded perspective view similar to FIG. 4 showing the front section of the front side, the sleeve and the plurality of leaf springs of the off-center impact structure in accordance with the first embodiment.

An engine receiving space is defined in the area confined between the first and second side members 30 and 32, and between the first and second cross-members 34 and 36. As shown in FIG. 5, within the engine compartment 16, a vehicle power plant P supported to the frame 22 inboard of and adjacent to the front side member 30.

The third cross-member 38 extends between forward ends of each of the third portions 30*e* and 32*e* of the first and second side members 30 and 32. The third cross-member 38 is welded to each of the first and second side members 30 and 32 and can serve as an attachment structure for a rear portion of the vehicle body structure 12 (at a mid-portion of the passenger compartment 18), and/or can serve as an attachment structure for the structure that defines the cargo area 20.

The front cross-member 40 is welded or otherwise rigidly fixed to the front ends 30*a* and 32*a* of the first and second side members 30 and 32. A bumper structure (not shown) can be attached to the front cross-member 40. Alternatively, the bumper structure (not shown) can be attached to the front ends 30*a* and 32*a* of the first and second side members 30 and 32 replacing the front cross-member 40.

The front cross member 40 is attached to the front side member 30 at or adjacent to the front end 30*a* of the front side member 30. The front cross member 40 includes an outboard portion 40*a* that extends from the front side member 30 forward of the off-center impact structure 14 in the outboard direction $O_D$. In response to an impact event of an off-center impact test, the outboard portion 40*a* of the front cross member 40 deforms and can contact a portion of the off-center impact structure 14, as described in greater detail below.

In the depicted embodiment as shown in FIGS. 3, 5 and 6, the front side member 30 defines a hollow interior 52. The first portion 30*c* (also referred to as the front-section) of the front side member 30 extends in a rearward direction from the front end 30*a* of the front side member 30 in a vehicle longitudinal direction parallel to the longitudinal center line $C_L$. As shown in FIG. 6, the front side member 30 has an outboard wall 54 and an inboard wall 56.

The outboard wall 54 defines an outboard opening 58 that extends through the outboard wall 54 and to the hollow interior 52. The inboard wall 56 of the front side member 30 defines an inboard opening 60 that extends through the inboard wall 56 and to the hollow interior 52. As shown in FIGS. 3, 5 and 6, the outboard opening 58 is located forward of the body attachment structure 42 and at least a portion of the inboard opening 60 is located rearward of the body attachment structure 42. Further, the inboard opening 60 is located rearward of the outboard opening 58. As shown in FIG. 6, a front edge of the outboard opening 58 being located a first distance $D_1$ from the front end 30*a* of the front side member 30. A front edge of the inboard opening 60 is located a second distance $D_2$ from the front end 30*a* of the front side member. The second distance $D_2$ is greater than the first distance $D_1$.

A description of a first embodiment of the off-center impact structure 14 is now provided with specific reference to FIGS. 3-9. As shown in FIGS. 3, 4, 5 and 6, the off-center impact structure 12 basically a sleeve 62 and a leaf-spring assembly 64. The sleeve 62 and each of the leaf springs of the leaf-spring assembly 64 are all made of a metallic material such as steel or iron alloy.

The sleeve 62 is a hollow beam-like member with open ends that expose a hollow interior of the sleeve 62. The sleeve 62 is inserted into the outboard opening 58 through the hollow interior 52 and to the inboard opening 60 of the front side member 30. The sleeve 62 basically defines a tunnel through the front side member 30. The sleeve 62, like the front side member 30, is preferably made of a metallic material such as steel and is fixedly attached to the outboard wall 54 and the inboard wall 56 by, for example, any of a variety or welding techniques. For example, the sleeve 62 can be welded to the outboard wall 54 and welded to the inboard wall 56 or can alternatively be attached to the front side member 30 via mechanical fasteners (not shown).

The sleeve 62 is dimensioned such that an inboard end 70 of the sleeve 62 is located proximate or flush with the inboard wall 56 of the front side member 30. An outboard portion 72 of the sleeve 62 extends out of the outboard of the outboard opening 58 of the outboard wall 54 of the front side member 30. An outboard end 74 of the sleeve 62 is spaced apart from the outboard wall 58 of the front side member 30.

The inboard end 70 has an inboard opening 76 at the inboard end 70, and an outboard opening 78 at the outboard end 74. The outboard opening 78 is larger than the inboard opening 76. Further, an interior surface 80 (an interior surface section) along a rearward side of the outboard portion 72 is slightly curved or offset rearward, as shown in FIGS. 3, 4, 5 and 6. More specifically, the interior surface 80 defines a diverging area 82 as one moves toward the outboard opening 78. The purpose of the diverging area is described hereinbelow.

As shown in FIGS. 3 and 4, an inboard portion 84 of the leaf-spring assembly 64 extends completely through hollow interior of the sleeve 62. An outboard portion 86 of the leaf-spring assembly 64 (FIG. 6) extends outboard from the outboard opening 78 of the sleeve 62. The leaf-spring assembly 64 is directly attached to the outboard portion 72 of the sleeve 62 via a mechanical fastener $F_1$ (a removable fastener).

A section of the leaf-spring assembly 64 is located within the outboard portion 72 of the sleeve 62 and is spaced apart from an interior surface 80 of the leaf-spring assembly 64. Specifically, a rearward facing surface 64a of the leaf-spring assembly 64 defined on the leaf spring $L_5$ is spaced apart from the interior surface 80 of the sleeve 62 with the leaf-spring assembly 64 in a non-impacted state. During an impact event, the leaf-spring assembly 64 absorbs impact energy and can deform. The outboard portion 86 of the leaf-spring assembly 64 located within the outboard portion 72 of the sleeve 62 can deform, move toward and may contact the interior surface 80.

The leaf-spring assembly 64 includes a plurality of leaf springs. In the depicted first embodiment, the leaf-spring assembly 64 includes five leaf springs $L_1$, $L_2$, $L_3$, $L_4$ and $L_5$. Each of the leaf springs $L_1$, $L_2$, $L_3$, $L_4$ and $L_5$ has an overall length that differs from the other leaf springs. Specifically, the leaf spring $L_1$ has an overall length greater than the leaf spring $L_2$. The leaf spring $L_2$ has an overall length greater than the leaf spring $L_3$. The leaf spring $L_3$ has an overall length greater than the leaf spring $L_4$. The leaf spring $L_4$ has an overall length greater than the leaf spring $L_5$.

Inboard ends of each of the leaf springs $L_1$, $L_2$, $L_3$, $L_4$ and $L_5$ are aligned with one another and are located adjacent or proximate the inboard end 70 of the sleeve 62. Outboard ends of each of the leaf springs $L_1$, $L_2$, $L_3$, $L_4$ and $L_5$ are offset from one another such that the leaf spring $L_1$ extends further outboard than the leaf spring $L_2$. Similarly, the leaf spring $L_2$ extends further outboard than the leaf spring $L_3$, the leaf spring $L_3$ extends further outboard than the leaf spring $L_4$, and the leaf spring $L_4$ extends further outboard than the leaf spring $L_5$. Hence, the leaf-spring assembly 64 extends in a lateral outboard direction from the front side member 30.

In the first embodiment, there are five leaf springs in the leaf-spring assembly 64. However, the actual number of leaf springs in the leaf spring assembly 64 can vary from vehicle design to vehicle design, as shown in the embodiments described below.

As shown in FIGS. 3 and 6, the leaf springs $L_1$ and $L_2$ are connected to one another by a first pin $P_1$ that extends through the leaf spring $L_1$ and at least part-way through the leaf spring $L_2$. Similarly, the leaf springs $L_1$, $L_2$, and $L_3$ are connected to one another by a second pin $P_2$ that extends through the leaf springs $L_1$ and $L_2$, and at least part-way through the leaf spring $L_3$. Third and fourth pins $P_3$ and $P_4$ extends through the leaf springs $L_1$, $L_2$, $L_3$ and $L_4$, and at least part-way through the leaf spring $L_5$ connecting all five leaf springs together. When the leaf-spring assembly 64 is installed within the sleeve 62, the first and second pins $P_1$ and $P_2$ are located outboard of the sleeve 62. The third pin $P_3$ is located within the sleeve 62. Further, the first pin $P_1$ is a third distance $D_3$ away from the first side member 30 and the second pin $P_2$ is located a fourth distance from the front side member 30.

As shown in FIG. 6, the sleeve 62 has a forward-facing surface 62b. The forward-facing surface 62b can alternatively be defined on the leaf spring $L_1$. The forward-facing surface 62b and the outboard wall 54 of the front side member 30 define an angle $\alpha_1$. The angle $\alpha_1$ can be any numeric value between 45 and 85 degrees with the leaf spring assembly 64 is a non-impacted state. Alternatively, the angle $\alpha_1$ can be 90 degrees such that the leaf spring assembly 64 is perpendicular to the front side member 30. Still further, the angle $\alpha_1$ can be greater than 90 degrees. The actual value of the angle $\alpha_1$ depends upon the overall vehicle design and the anticipated forces that might act on the leaf spring assembly 64 in response to an impact event.

Figure 7:
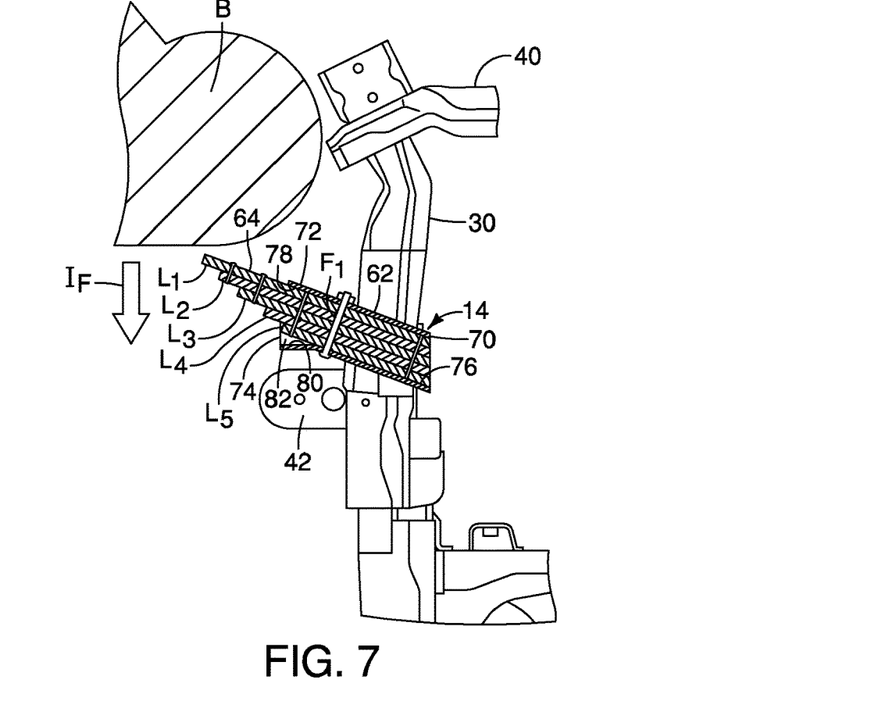
FIG. 7 is another top cross-sectional view of the front side member, the sleeve and the plurality of leaf springs with a part of the front side member shown in an initial stage of an impact event and with the plurality of leaf springs in the non-impacted state in accordance with the first embodiment.
Figure 8:
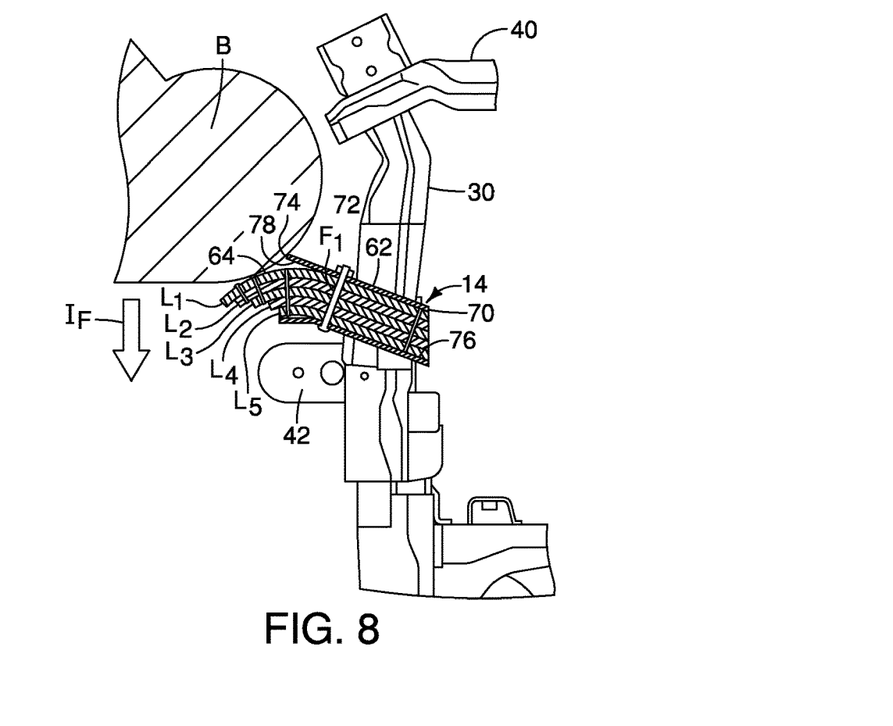
FIG. 8 is yet another top cross-sectional view of the front side member, the sleeve and the plurality of leaf springs similar to FIG. 7, with the plurality of leaf springs in an impacted state in accordance with the first embodiment.

The off-center impact structure 14, and in particular, the leaf spring assembly 64 is configured to react to what is referred to as an off-center impact event. As shown in FIG. 7, if an outboard area of the vehicle 10 (outboard of the front side member 30) should contact a fixed barrier B, the front cross-member 40 will contact the barrier B and deform. In FIG. 7, the barrier B has not yet made contact with the leaf spring assembly 64. Therefore, the leaf spring assembly 64 is shown in a non-impacted state. As the vehicle 10 continues moving, the off-center impact structure 14 will begin to deform once contact is made with the barrier B. The speed and overall mass of the vehicle 10 and the fixed positioning of the barrier B generates an impact force $I_F$ during the impact event. The impact force $I_F$ acts on the leaf spring assembly 64 causing one or more of the leaf springs $L_1$, $L_2$, $L_3$, $L_4$ and $L_5$ to deform. FIG. 8 shows the leaf spring assembly 64 in an impacted state (deformed).

Initially, only the first leaf spring $L_1$ of the leaf springs $L_1$, $L_2$, $L_3$, $L_4$ and $L_5$ since the first leaf spring $L_1$ is forward of the leaf springs $L_2$, $L_3$, $L_4$ and $L_5$ and in the first embodiment is angled to extend further forward of the leaf springs $L_2$, $L_3$, $L_4$ and $L_5$. As the impact event continues, others of the leaf springs $L_1$, $L_2$, $L_3$, $L_4$ and $L_5$ can also begin to deform. During the impact event, the sleeve 62 absorbs some of the impact force $I_F$ transferring the force to the front side member 30 and the frame 22.

The number of leaf springs that are deformed in the impact event, depend upon the level of force of the impact force $I_F$ acting on the off-center impact structure 14. For example, if the vehicle 10 is moving at a low rate of speed of, for example, 10-20 MPH, then the level of deformation of one or more of the leaf springs $L_1$, $L_2$, $L_3$, $L_4$ and $L_5$ may be limited to one or two of the leaf springs $L_1$, $L_2$, $L_3$, $L_4$ and $L_5$ being deformed. If the rate of speed of the vehicle 10 is higher, three or more of the leaf springs $L_1$, $L_2$, $L_3$, $L_4$ and $L_5$ can be deformed. If the level of force of the impact force $I_F$ acting on the off-center impact structure 14 is high enough to deform all five of the leaf springs $L_1$, $L_2$, $L_3$, $L_4$ and $L_5$, then the leaf spring $L_5$ may deform and contact the interior surface 80 of the sleeve 62 thereby transferring further levels of force to the sleeve 62.

The overall configuration of the leaf spring assembly 64 is such that the deformation resulting from the off-center impact event can be limited to the leaf spring assembly 64, with minimal, if any, damage to the front side member 30 and rearward areas of the frame 22.

Figure 9:
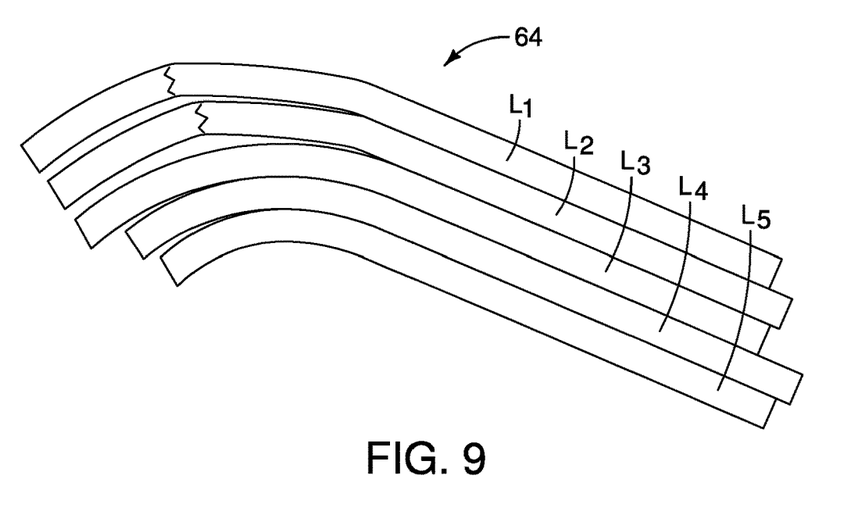
FIG. 9 is a top cross-sectional view of the front side member, the sleeve and the plurality of leaf springs with a part of the front side member shown in an initial stage of an impact event and with the plurality of leaf springs in the non-impacted state in accordance with the first embodiment.

FIG. 9 shows schematically one example of deformation of the leaf spring assembly 64. In this example, the first and second leaf springs $L_1$ and $L_2$ have deformed and begun to fracture. The first and second leaf springs $L_1$ and $L_2$ have absorbed significant levels of the impact forces $I_F$, with the third, fourth and fifth leaf springs $L_3$, $L_4$ and $L_5$ absorbing lower levels of the impact forces $I_F$. Hence, the third, fourth and fifth leaf springs $L_3$, $L_4$ and $L_5$ have not fractured.

The configuration of the leaf spring assembly 64 can be thought of in a manner similar to upright aligned dominos. Initially during an impact event, impact forces $I_F$ begin acting on the first leaf spring $L_1$. Like a spring and depending upon the level of force, the first leaf spring $L_1$ can undergo elastic deformation and upon release of any forces, can spring back to its original shape. With a sufficient level of force, the first leaf spring $L_1$ can deform, and like a domino, can impart significant levels of force to the second leaf spring $L_2$. The second leaf spring $L_2$ can undergo elastic deformation, or, in response sufficient levels of force can undergo plastic deformation, as shown in FIG. 9 (impacted state). The number of leaf springs that deform is dependent upon the overall impact force $I_F$.

One effect of the above described plurality of leaf springs, is that each leaf spring absorbs its own portion of the impact energy of an off-center impact event. The first leaf spring $L_1$ absorbs a portion of the impact energy and can undergo either elastic or plastic deformation before the second leaf spring $L_2$ begins to absorb its portion of the impact energy. Each of the plurality of leaf springs absorbs a respective portion of impact energy initially independent of adjacent rearward leaf springs. Hence, the impact energy is distributed to the plurality of leaf springs at least partially independent of the remaining plurality of leaf springs.

Second Embodiment

Figure 10:
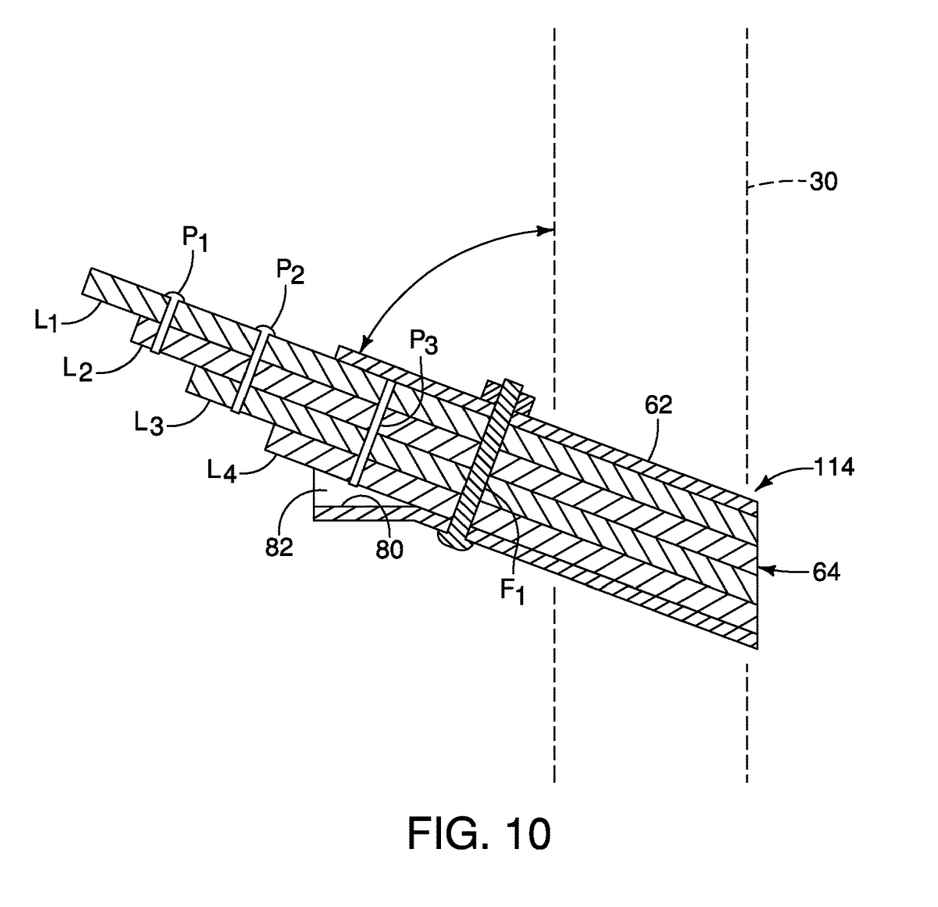
FIG. 10 is a cross-sectional view of a leaf spring assembly that includes four leaf springs in accordance with a second embodiment.

Referring now to FIG. 10, an off-center impact structure 114 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the off-center impact structure 114 includes the sleeve 62 attached to the front side member 30, as described above with reference to the first embodiment. The off-center impact structure 114 also includes a modified leaf spring assembly 64 that includes only four leaf springs. Specifically, the off-center impact structure 114 includes only leaf springs $L_1$, $L_2$, $L_3$ and $L_4$. The leaf springs $L_1$, $L_2$, $L_3$ and $L_4$ include the locking pins $P_1$, $P_2$ and $P_3$, and are fixed to the sleeve 62 via the fastener $F_1$.

Third Embodiment

Figure 11:
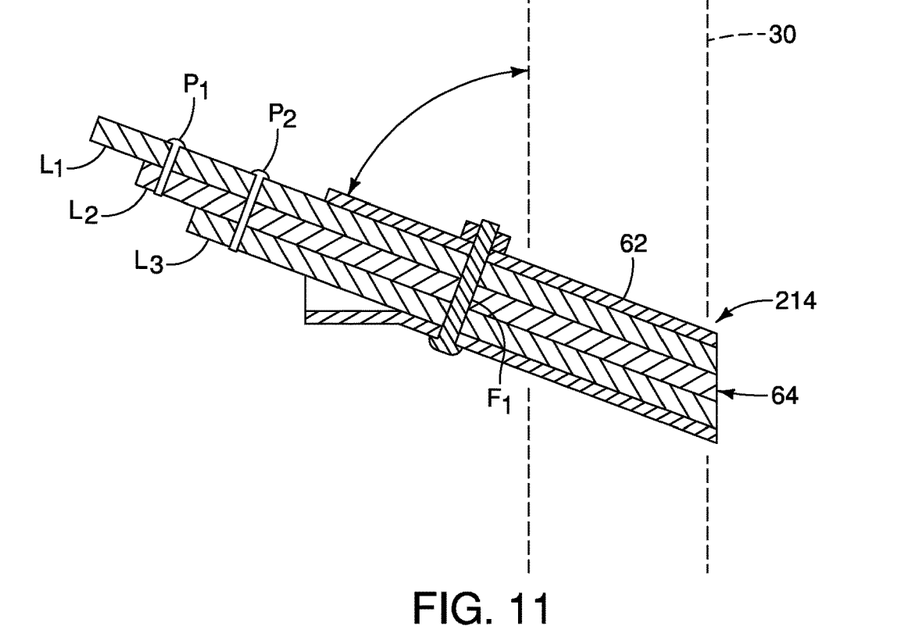
FIG. 11 is a cross-sectional view of a leaf spring assembly that includes three leaf springs in accordance with a third embodiment.

Referring now to FIG. 11, an off-center impact structure 214 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the off-center impact structure 214 includes the sleeve 62 attached to the front side member 30, as described above with reference to the first embodiment. The off-center impact structure 214 also includes a modified leaf spring assembly 64 that includes only three leaf springs. Specifically, the off-center impact structure 214 includes only leaf springs $L_1$, $L_2$ and $L_3$. The leaf springs $L_1$, $L_2$ and $L_3$ include the locking pins $P_1$ and $P_2$, and, are fixed to the sleeve 62 via the fastener $F_1$.

Fourth Embodiment

Figure 12:
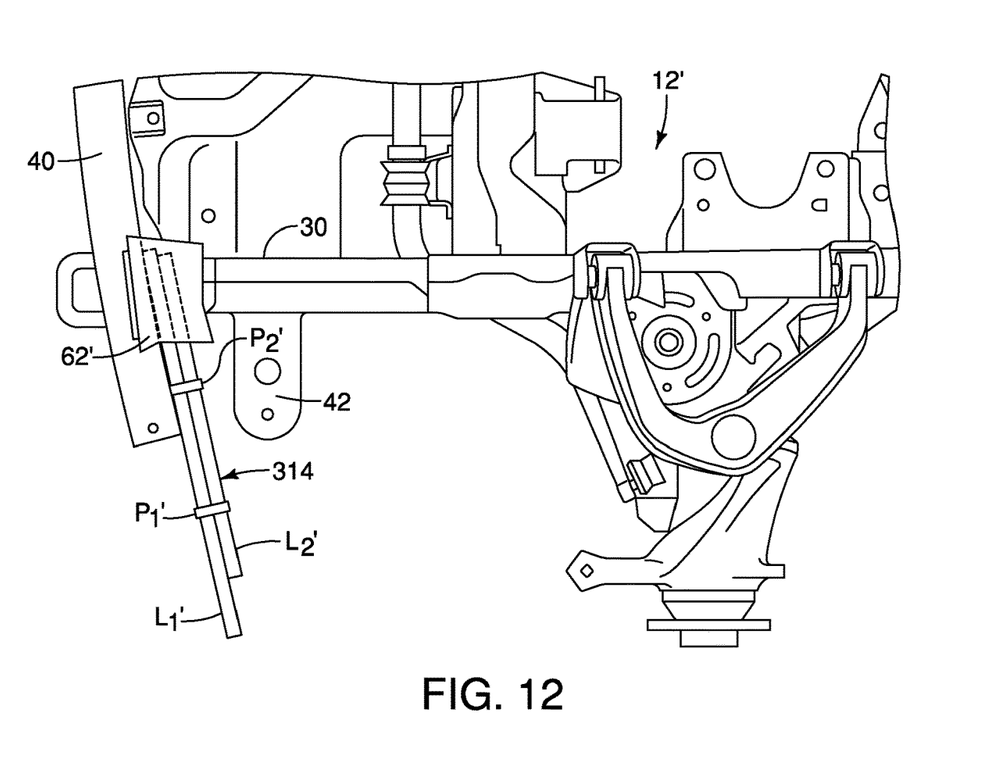
FIG. 12 is a top view of a front portion of a vehicle frame equipped with an off-center impact structure that includes a sleeve fixed to a front end of a front side member and a plurality of leaf springs attached to the sleeve, the plurality of leaf springs having two leaf springs in accordance with a fourth embodiment.
Figure 13:
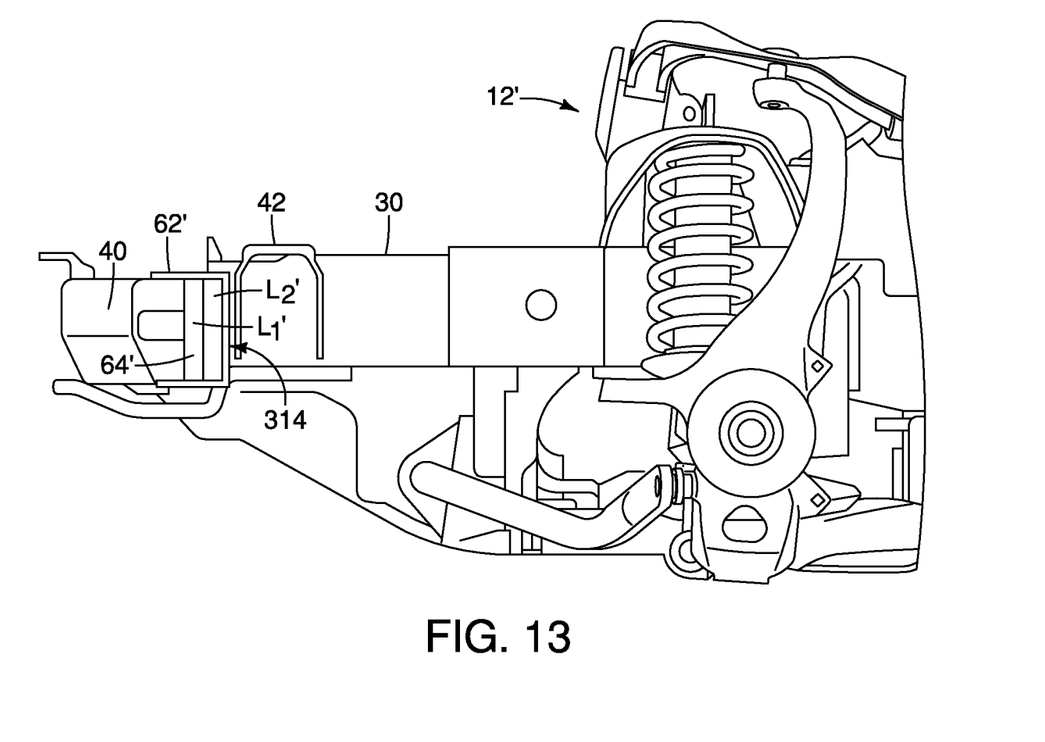
FIG. 13 is a side view of the front portion of a vehicle frame depicted in FIG. 12, showing the sleeve and the plurality of leaf springs in accordance with the fourth embodiment.
Figure 14:
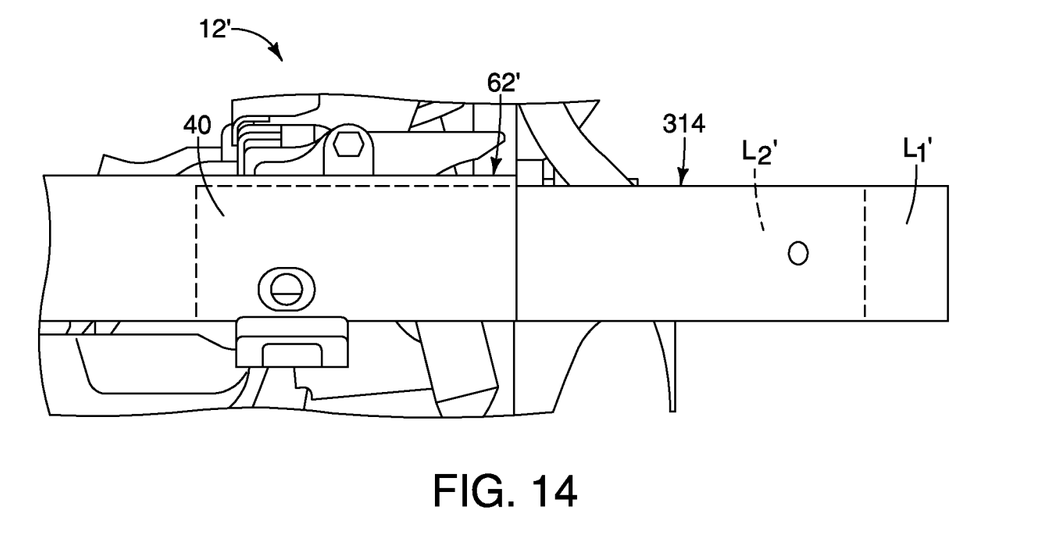
FIG. 14 is a front view of the front portion of a vehicle frame depicted in FIGS. 12 and 13, showing the sleeve and the plurality of leaf springs in accordance with the fourth embodiment.

Referring now to FIGS. 12-14, an off-center impact structure 314 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. The parts of the fourth embodiment that differ from the parts of the first embodiment will be indicated with a single prime (').

In the fourth embodiment, the off-center impact structure 314 is attached to a vehicle frame 12' that includes the front side member 30 and body attachment structure 42, as shown in FIGS. 12-13. The off-center impact structure 314 includes a sleeve 62' that is welded or otherwise rigidly fixed to a front end of the front side member 30 and rearward of the front cross-member 40, as shown in FIG. 12. First and second leaf springs $L_1$ and $L_2$ are inserted into the sleeve 62' and are attached thereto, extending in an outboard direction. The first leaf spring $L_1$ is forward of and longer than the second leaf spring $L_2$. The first and second leaf springs $L_1$ and $L_2$ are fixed to one another via the locking pins $P_1$ and $P_2$, and, are fixed to the sleeve 62' via at least one and preferably two fasteners (not shown) located within the sleeve 62'.

Fifth Embodiment

Figure 15:
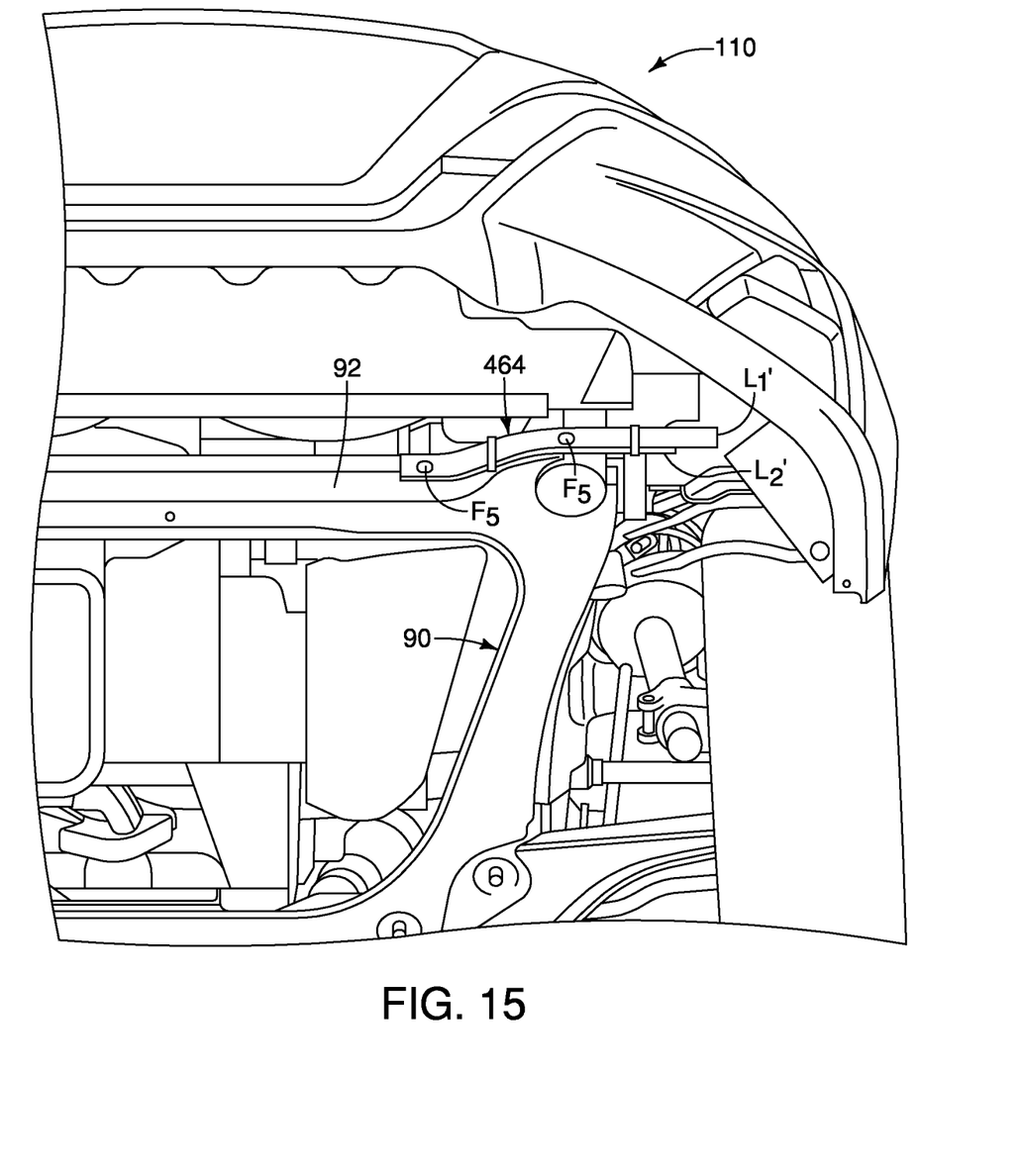
FIG. 15 is a perspective bottom view of a vehicle looking up at an engine cradle showing a leaf spring assembly with two leaf springs that define an off-center impact structure attached to one lateral front side of the engine cradle in accordance with a fifth embodiment.
Figure 16:
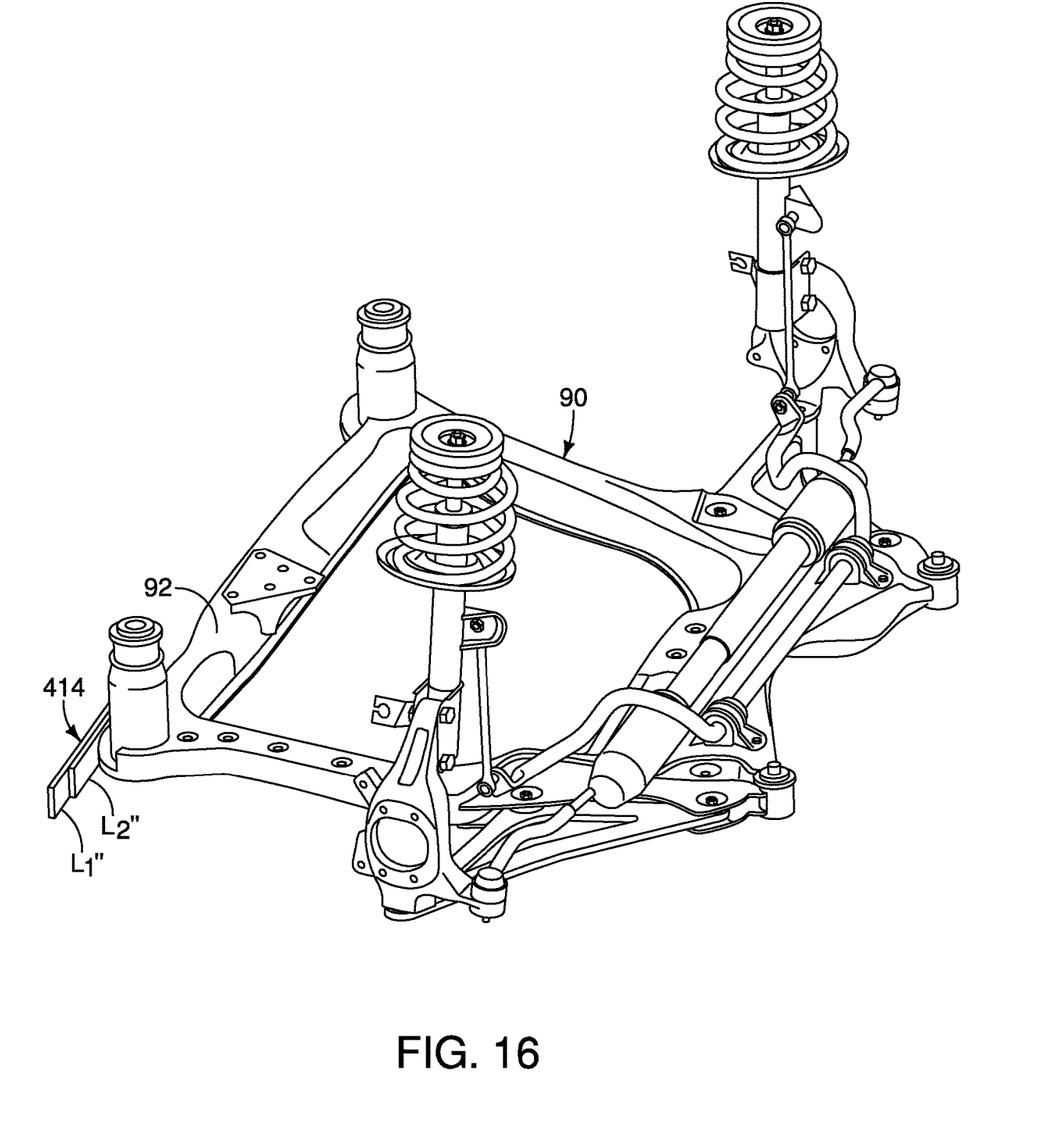
FIG. 16 is a perspective view of the engine cradle depicted in FIG. 15 showing the leaf spring assembly of the off-center impact structure attached to the lateral front side of the engine cradle in accordance with a fifth embodiment.

Referring now to FIGS. 15-16, a vehicle 110 has an engine cradle 90 and an off-center impact structure 14 that includes a leaf spring assembly 464 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity. The parts of the fifth embodiment that differ from the parts of the first embodiment will be indicated with a single prime (') or a double prime (").

In the fifth embodiment, the engine cradle 90 is installed to structural elements of the vehicle 110, at a location under a front portion of the vehicle 110. Vehicles, such as the vehicle 110 of the fifth embodiment that include the engine cradle 90 are described in the patent documents incorporated herein by reference in the description of the first embodiment. Consequently, further description of engine cradle 90 is omitted for the sake of brevity.

The leaf spring assembly 464 is installed to one or both sides of a front section 92 of the engine cradle 90. FIG. 16 shows the engine cradle 90 removed from the vehicle 110. The leaf spring assembly 464 includes first and second leaf springs $L_1''$ and $L_2''$ that are attached to the one end of the front section 92 of the engine cradle 90. The first and second leaf springs $L_1''$ and $L_2''$ extend in an outboard direction from the front section 92 of the engine cradle 90. The first leaf spring $L_1''$ is forward of and is longer than the second leaf spring $L_2''$. The first and second leaf springs $L_1''$ and $L_2''$ are fixed to the sleeve 62 via fasteners $F_5$.

Sixth Embodiment

Figure 17:
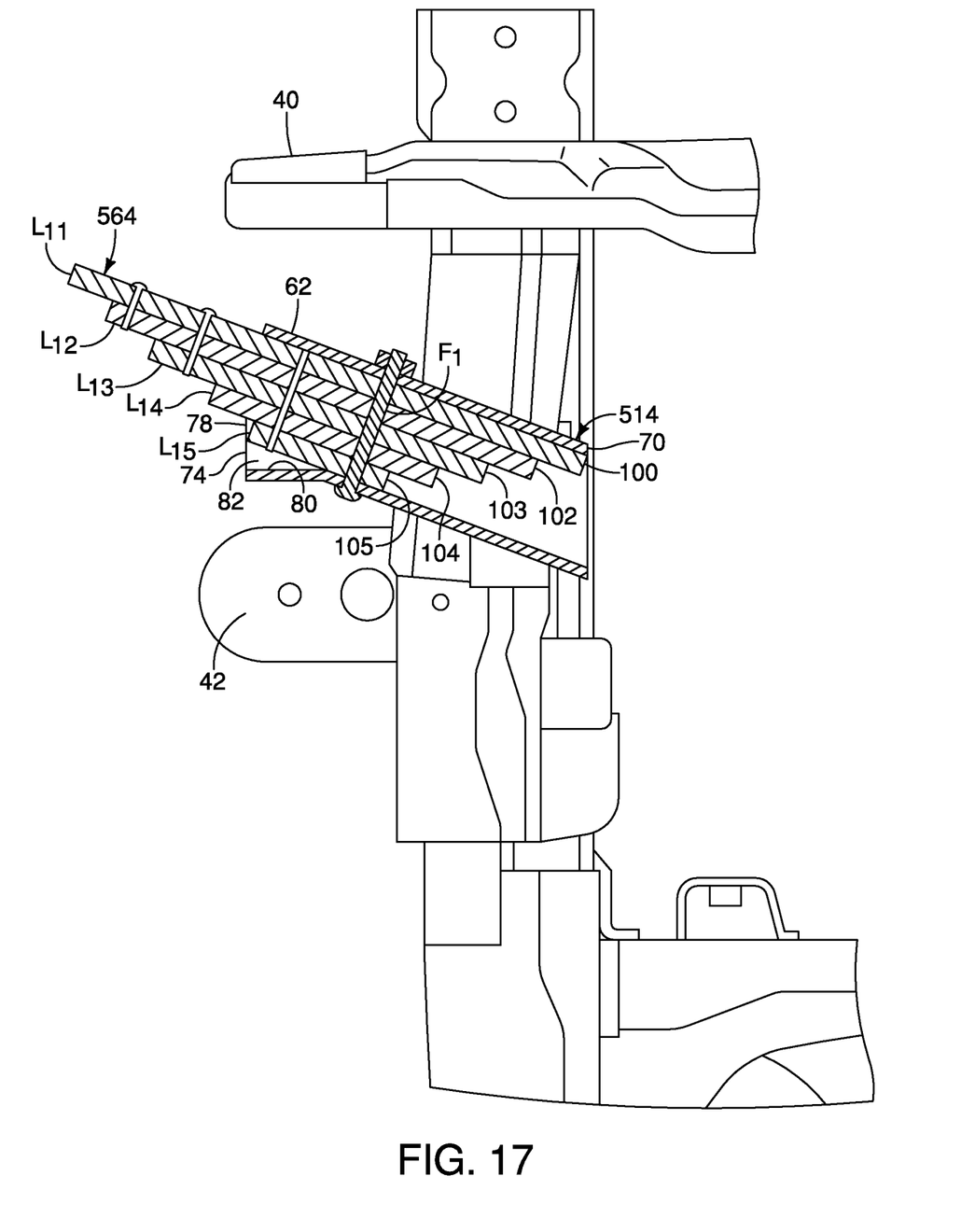
FIG. 17 is a top part cross-sectional view of the front section of the front side member showing a sleeve and a plurality of leaf springs in accordance with a sixth embodiment.

Referring now to FIG. 17, an off-center impact structure 514 in accordance with a sixth embodiment will now be explained. In view of the similarity between the first and sixth embodiments, the parts of the second embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the sixth embodiment, the off-center impact structure 512 includes the sleeve 62 and a leaf spring assembly 564 that is described below. The sleeve 62 is as described in the first embodiment. However, in the sixth embodiment, the leaf spring assembly 64 of the first embodiment has been replaced with the leaf spring assembly 564.

The leaf spring assembly 564 includes leaf springs $L_{11}$, $L_{12}$, $L_{13}$, $L_{14}$ and $L_{15}$. The first leaf spring $L_{11}$ is approximately the same length and dimension as the leaf spring $L_1$ of the first embodiment. An outboard end of the second leaf spring $L_{12}$ is offset and inboard of the outboard end of the first leaf spring $L_{11}$. Further, an inboard end of the second leaf spring $L_{12}$ within the sleeve 62 is offset and outboard of the inboard end of the first leaf spring $L_{11}$. In the first embodiment, the inboard end of the second leaf spring $L_2$ is aligned with the inboard end of the first leaf spring $L_1$. In the sixth embodiment, the inboard end 102 of the second leaf spring $L_{12}$ is positioned outboard of the inboard end 100 of the first leaf spring $L_{11}$. This relationship provides weight reduction but does not noticeably change the impact force receiving response of the leaf spring assembly 564, as compared to the impact force receiving response of the leaf spring assembly 64 of the first embodiment.

Similarly, an outboard end of the third leaf spring $L_{13}$ is offset and inboard of the outboard end of the second leaf spring $L_{12}$. An inboard end 103 of the third leaf spring $L_{13}$ within the sleeve 62 is offset and outboard of the inboard end 102 of the second leaf spring $L_{12}$. Further, an outboard end of the fourth leaf spring $L_{14}$ is offset and inboard of the outboard end of the third leaf spring $L_{13}$. An inboard end 104 of the fourth leaf spring $L_{14}$ within the sleeve 62 is offset and outboard of the inboard end 103 of the third leaf spring $L_{13}$. As well, an outboard end of the fifth leaf spring $L_{15}$ is offset and inboard of the outboard end of the fourth leaf spring $L_{14}$. An inboard end 105 of the fifth leaf spring $L_{15}$ within the sleeve 62 is offset and outboard of the inboard end 104 of the fourth leaf spring $L_{14}$.

The various vehicle features and components other than the off-center impact structures are conventional components that are well known in the art. Since such vehicle features and components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the off-center impact structure. Accordingly, these terms, as utilized to describe the present invention should be interpreted relative to a vehicle equipped with the off-center impact structure.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure comprising:
   a vehicle structure having a front side member with a front end, a front-section extending rearward from the front end, a coil spring support and a suspension structure, the front side member extending in a vehicle longitudinal direction; and
   an off-center impact structure that includes a leaf-spring assembly with a plurality of leaf-springs attached to one another and attached to the front side member at the front-section rearward from the front end, and forward of the coil spring support and the suspension structure such that the leaf-spring assembly extends in a lateral outboard direction from the front side member, each of the plurality of leaf-springs being a planar elongated member extending along and parallel to an adjacent one of the plurality of leaf-springs in a non-impacted state, and each of the plurality of leaf-springs having a differing overall length measured in the lateral outboard direction.

2. The vehicle body structure according to claim 1, wherein
the leaf-spring assembly includes at least two leaf springs attached to one another.

3. The vehicle body structure according to claim 1, wherein
the leaf-spring assembly includes at least three leaf springs attached to one another.

4. The vehicle body structure according to claim 3, wherein
a forward most one of the at least three leaf springs has an overall length greater than a remainder of the at least three leaf springs, and
a second leaf spring adjacent to and rearward of the forward most one of the at least three leaf springs has an overall length that is greater than each rearward one or ones of the at least three leaf springs.

5. The vehicle body structure according to claim 1, wherein
the vehicle structure includes a vehicle frame having the front side member.

6. The vehicle body structure according to claim 1, wherein
the vehicle structure includes vehicle body and an engine cradle attached to an underside of a forward section of the vehicle body, with a portion of the engine cradle defining the front side member.

7. The vehicle body structure according to claim 6, further comprising
a vehicle power plant supported to the engine cradle inboard of and adjacent to the front side member.

8. The vehicle body structure according to claim 1, further comprising
a vehicle power plant supported to the vehicle structure inboard of and adjacent to the front side member.

9. The vehicle body structure according to claim 1, wherein
the leaf-spring assembly of the off-center impact structure has a forward-facing surface and an outboard wall of the front side member has an outboard facing surface such that in the non-impacted state the forward-facing surface and the outboard facing surface define an acute angle therebetween that is between 45 and 85 degrees.

10. A vehicle body structure comprising:
a vehicle structure having a front side member with a front end and a front-section extending rearward from the front end, the front side member extending in a vehicle longitudinal direction, the front side member defining a hollow interior, the front side member having an outboard wall with an outboard opening extending through the outboard wall and to the hollow interior and an inboard wall with an inboard opening extending through the inboard wall and to the hollow interior; and
an off-center impact structure that includes a leaf-spring assembly with a plurality of leaf-springs attached to one another and attached to the front side member at the front-section such that the leaf-spring assembly extends in a lateral outboard direction from the front side member, at least a portion of the leaf-spring assembly extends through the outboard opening into the hollow interior of the front side member.

11. The vehicle body structure according to claim 10, wherein
the outboard opening is located a first distance from the front end of the front side member and the inboard opening being located a second distance from the front end of the front side member, the second distance being greater than the first distance.

12. The vehicle body structure according to claim 10, wherein
the off-center impact structure further includes a sleeve that extends through the outboard opening, the hollow interior and through the inboard opening of the front side member, the sleeve being fixedly attached to the outboard wall and the inboard wall with a portion of the leaf-spring assembly extending completely through the sleeve, the leaf-spring assembly being directly attached to the sleeve.

13. The vehicle body structure according to claim 12, wherein
the sleeve is dimensioned such that an inboard end of the sleeve is located proximate or flush with the inboard wall of the front side member, an outboard portion of the sleeve extends out of the outboard opening of the outboard wall of the front side member, and an outboard end of the sleeve is spaced apart from the outboard wall of the front side member.

14. The vehicle body structure according to claim 12, wherein
an interior surface section of the sleeve located outboard of the outboard wall of the front side member is spaced apart from a rearward facing surface of the leaf-spring assembly.

15. The vehicle body structure according to claim 12, wherein
the sleeve is welded to the outboard wall and welded to the inboard wall of the front side member.

16. The vehicle body structure according to claim 12, wherein
the leaf-spring assembly is directly attached to the sleeve via a removable fastener.

17. A vehicle body structure comprising:
a vehicle structure having a front side member with a front end, a front-section extending rearward from the front end, a coil spring support and a suspension structure, the front side member extending in a vehicle longitudinal direction; and
an off-center impact structure that includes at least two leaf-springs attached to one another and attached to the front side member at the front-section rearward from the front end, and forward of the coil spring support and the suspension structure such that the at least two leaf-springs extend in a lateral outboard direction from the front side member, each of the two leaf-springs being a planar elongated member in a non-impacted state and extending along side one another, a forward most one of at least two leaf-springs having a forward-facing surface and the outboard wall of the front side member having an outboard facing surface such that in the non-impacted state the forward-facing surface and the outboard facing surface define an acute angle therebetween that is between 45 and 85 degrees.

18. The vehicle body structure according to claim 17, wherein
the leaf-spring assembly includes at least three leaf springs attached to one another, each of the leaf springs having differing overall lengths as measured in the lateral outboard direction.

19. The vehicle body structure according to claim 18, wherein
a forward most one of the at least three leaf springs has an overall length greater than a remainder of the at least three leaf springs, and
a second leaf spring adjacent to and rearward of the forward most on of the at least three leaf springs has an overall length that is greater than each rearward one or ones of the at least three leaf springs.

20. The vehicle body structure according to claim 17, wherein
the leaf-spring assembly includes at least four leaf springs attached to one another, each of the leaf springs having differing overall lengths as measured in the lateral outboard direction, with the forward most one of the at least four leaf springs extending in the lateral outboard direction away from the front side member a distance greater than rearward ones of the at least four leaf springs.

* * * * *